Patented Aug. 23, 1949

2,479,972

UNITED STATES PATENT OFFICE 2,479,972

MONOALKAMINE ESTERS OF PYRROLE-5-CARBOXYLIC ACIDS

Theodore F. Scholz, Plainfield, N. J., assignor to American Cyanamid Company, New York, N. Y., a corporation of Maine No Drawing. Application November 14, 1946, Serial No. 709,780

3 Claims. (Cl. 260—313)

This invention relates to alkamine esters of pyrrole-5-carboxylic acids.

Alkyl esters of pyrrole-2-carboxylic acids are known, but alkamine esters are not obtainable by ordinary means. It is with these esters that the present invention is concerned. They may be represented broadly by the following formula:

R Pyr—COOAlk in which the Alk stands for dialkylaminoalkyl, Pyr stands for a pyrrole, and the ester group is attached to the 5 carbon atom of the pyrrole ring. Some of the preferred esters of the present invention are those in which there is present only a single ester group. This preferred modification may be represented by the following formula:

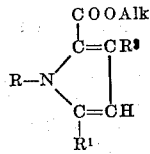

in which Alk stands for dialkylaminoalkyl and R, $R^1$ and $R^2$ stand for hydrogen or alkyl. The esters of the present invention are useful in many fields, some of them being activators for rubber accelerators and other exhibiting local anaesthetic power.

The esters of the present invention may be prepared by catalyzed alcoholysis of the corresponding alkyl esters, such as the methyl and ethyl esters, using an alkali metal alcoholate as the catalyst. The alkyl esters are prepared by known methods.

The alkamine esters of the present invention are obtainable in the form of the free bases or in the form of their salts, such as hydrochlorides. When used as local anaesthetics the latter form is preferred as it is in general more water soluble. The free bases, however, show greater effectiveness as activators for rubber accelerators.

The invention will be illustrated in greater detail in conjunction with the following specific examples which are typical illustrations. The parts are by weight and temperatures are uncorrected unless otherwise specified.

Example 1

The hydrochloride of β-diethylaminoethyl-1,2,4-trimethylpyrrole-5-carboxylate

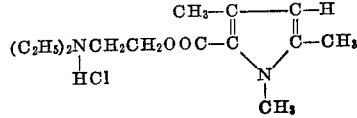

54 parts of ethyl-1,2,4-trimethylpyrrole-5-carboxylate-3-carboxylic acid (which may be prepared by partial hydrolysis of the corresponding diethyl ester with sulfuric acid), and 90 parts of flucrene are heated together at atmospheric pressure. The mass melts and carbon dioxide is slowly evolved. When the temperature approaches 215° C. the evolution becomes more rapid and the reaction temperature increases to about 250° C. at which all of the carbon dioxide is evolved. The temperature and pressure are then quickly lowered and 86 parts of a fraction distilling over at 102–108° C. at 3–4 mm. pressure are obtained. This constitutes crude ethyl-1,2,4-trimethylpyrrole-5-carboxylate contaminated with a little fluorene and is suspended in 97 parts of β-diethylaminoethanol to which a small amount of sodium has been added as a catalyst. The mixture is then heated, resulting in complete solution and some darkening and the temperature is raised to distill off ethyl alcohol slowly. After the temperature begins to rise beyond the boiling point of ethyl alcohol the pressure is lowered and the excess amino alcohol distilled off.

A residue is obtained which is extracted thoroughly with ether, the ether extracts washed with brine and dried. A solution of dry hydrogen chloride in anhydrous ether is then gradually added with vigorous stirring until the oily hydrochloride separates. The addition of hydrogen chloride is stopped just short of the neutral point of litmus as the compound is somewhat acid sensitive. The precipitate is filtered and dried and melts at 137.9–140.9° C. (corr.). It is soluble in water, chloroform and ethyl alcohol and insoluble in anhydrous ether. The product is not perfectly pure and if desired can be further purified by recrystallization from chloroform.

The same product is obtained by starting from the methyl 1,2,4-trimethyl pyrrole-5-carboxylate-3-carboxylic acid instead of the corresponding ethyl ester. The reaction proceeds in the same manner except that the initial distillation temperature corresponds to the removal of methyl alcohol instead of ethyl alcohol.

Example 2

The procedure of Example 1 is followed but the β-diethylamino ethanol is replaced by a stoichiometrically equivalent amount of β-dimethylamino ethanol. The product obtained has substantially the same properties as that of Example 1.

Example 3

β - diethylaminopropyl - 1,2,4 - trimethylpyrrole-5-carboxylate

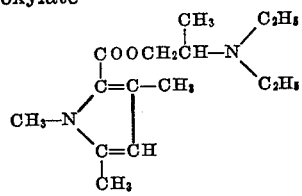

The procedure of Example 1 is followed, substituting a corresponding amount of β-diethylaminopropanol for the β-diethylaminoethanol. The ether extract contains the free ester which can be recovered by evaporating off the ether.

*Example 4*

The procedure of Example 3 is followed but the β-diethylamino propanol is replaced by a stoichiometrically equivalent amount of γ-dipropylaminopropanol. The product obtained is substantially the same in properties as that of Example 3.

In the foregoing examples the catalyst sodium is added to the diethylaminoalkanol where it, of course, reacts to produce the alcoholate. The addition of the sodium is in no sense critical. It may be added to the reaction mixture, or it may be reacted either with the amino alcohol or with ordinary ethyl alcohol to form an alcoholate and the ready formed alcoholate added to the reaction mixture. The relative insensitiveness of the reaction to the method of addition of the sodium alcoholate and the smoothness of the reaction is in marked contrast to the ordinary characteristics of amino alcohols and their esters, which usually are sensitive to oxidation in alkaline solution. No reason is advanced here why the present reaction proceeds readily in spite of this normal tendency to side reactions.

The amount of alkali metal alcoholate present is not critical, but it should be in catalytic amounts, that is to say, amounts which are sufficient to vigorously catalyze the reaction but far below stoichiometric proportions. Good results are obtained with amounts of alcoholate of the order of 1/10 mole per mole of the carbethoxypyrrole. This proportion is not critical and the term "catalytic amounts" will be used in the claims in its ordinary sense of small amounts far below stoichiometric proportions. Sodium can be replaced by potassium, but this presents no advantage in the reaction and, therefore, does not economically warrant the higher cost of potassium. For this reason the sodium alcoholate is preferred as the catalyst.

In many of the examples the hydrochlorides of the products are described. These salts are most readily prepared and where the product is of utility as a local anaesthetic are preferred because they are readily soluble in water. The esters, however, are capable of reacting with other strong acids to produce the corresponding salts.

This application is in part a continuation of my copending application Serial No. 496,955, filed July 31, 1943, now abandoned.

I claim:

1. Compounds selected from the group consisting of esters of 1,2,4-trimethylpyrrole-5-carboxylic acid, having the formula:

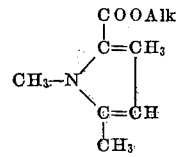

in which Alk stands for dialkylaminoalkyl and addition salts of the esters with strong acids.

2. A compound included in the group consisting of β-diethylaminoethyl-1,2,4-trimethylpyrrole-5-carboxylate having the following formula:

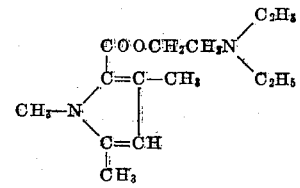

and the addition salts of the ester with strong acids.

3. A method of preparing an alkamine ester of a 1,2,4-trimethylpyrrole-5-carboxylic acid which comprises heating the corresponding alkyl ester with the desired dialkylamino alkanol in the presence of a catalytic amount of an alkali metal alcoholate.

THEODORE F. SCHOLZ.

REFERENCES CITED

The following references are of record in the file of this patent:

Gilman et al., J. Am. Chem. Soc., vol. 47: 245–254 (1925).